United States Patent
Velázquez López et al.

(10) Patent No.: US 8,041,547 B2
(45) Date of Patent: Oct. 18, 2011

(54) COMPUTER-AIDED METHOD FOR A COST-OPTIMIZED CALCULATION OF AERODYNAMIC FORCES ON AN AIRCRAFT

(75) Inventors: Angel Gerardo Velázquez López, Madrid (ES); Diego Alonso Fernández, Burgos (ES); José Manuel Vega De Prada, Madrid (ES); Luis Santiago Lorente Manzanares, Madrid (ES)

(73) Assignees: Airbus Espana, S. L., Madrid (ES); Universidad Politecnica de Madrid, Madrid (ES)

( * ) Notice: Subject to any disclaimer, the term of this patent is extended or adjusted under 35 U.S.C. 154(b) by 338 days.

(21) Appl. No.: 12/348,053

(22) Filed: Jan. 2, 2009

(65) Prior Publication Data

US 2010/0106471 A1    Apr. 29, 2010

(30) Foreign Application Priority Data

Oct. 28, 2008    (ES) .................................. 200803062

(51) Int. Cl.
    *G06F 17/10*    (2006.01)
(52) U.S. Cl. ................................................. 703/2; 703/9
(58) Field of Classification Search .................... 703/2, 9
    See application file for complete search history.

(56) References Cited

U.S. PATENT DOCUMENTS

| | | | |
|---|---|---|---|
| 2003/0063096 A1* | 4/2003 | Burke | 345/582 |
| 2003/0227457 A1* | 12/2003 | Pharr et al. | 345/426 |
| 2008/0162090 A1* | 7/2008 | Perry et al. | 703/1 |
| 2008/0275677 A1* | 11/2008 | Landon | 703/2 |

OTHER PUBLICATIONS

Silva et al., Development of Reduce-Order Models for Aeroelastic Analysis and Flutter Prediction Using the CFL3Dv6.0 Code, Joournal of Fluids and Structures, Jul. 2004, pp. 729-745.*
De C. Henshaw et al., Non-Linear Aeroelastic Prediction for Aircraft Applications, Progress in Aerospace Sciences, May-Aug. 2007, pp. 65-137.*
Raveh, Computational-Fluid-Dynamics-Based Aeroelastic Analysis and Structural Design Optimization—A Researcher's Perspective, Computer Methods in Applied Mechanics and Engineering, Aug. 2005, pp. 3453-3471.*
Yu et al, T.-Y. Application of NURBS in Numerical Grid Generation, Computer-Aided Design, vol. 2, No. 2, Feb. 1995, pp. 147-157.*
Vos et al, J.B. Navier-Stokes Solvers in European Aircraft Design, Progress in Aerospace Sciences, vol. 38, No. 8, Nov. 2002, pp. 601-697.*

* cited by examiner

*Primary Examiner* — Russell W Frejd
(74) *Attorney, Agent, or Firm* — Ladas & Parry LLP

(57) ABSTRACT

A computer-aided method suitable for assisting in the design of an aircraft by providing the values of dimensional variables, dependant of a predefined set of parameters, for the complete aircraft or an aircraft component, comprising the following steps: a) Defining a parametric space grid; b) Obtaining a suitable Reduced Order Model (ROM) model, particularly a Proper Orthogonal Decomposition (POD) model, for calculating said variables for whatever point over the parametric space through an iterative process. Computer Fluid Dynamics (CFD) is used to calculate said variables for an appropriately selected set of points over the parametric space, which are used to approximate, via ROM and ad hoc interpolation, the variables in any other point over the parametric space. The method minimizes the required number of CFD calculations (to minimize the computational cost, which dramatically depends on this number) for a given level of error.

8 Claims, 2 Drawing Sheets

COMPUTER-AIDED METHOD FOR A COST-OPTIMIZED CALCULATION OF AERODYNAMIC FORCES ON AN AIRCRAFT

FIELD OF THE INVENTION

The present invention refers to methods for assisting in the design of aircraft by making cost-optimized calculations of the aerodynamic forces experimented by the complete aircraft or an aircraft component.

BACKGROUND OF THE INVENTION

A common situation in practical industrial applications related to product development is the need to perform many surveys inside a space of state parameters. In the specific case of aeronautics, the calculation of the aerodynamic forces experienced by aircraft components is an important feature, in order to optimally design its structural components so that the weight of the structure is the minimum possible, but at the same time being able to withstand the expected aerodynamic forces.

Thanks to the increase of the use of the Computer Fluid Simulation Capability, nowadays, the determination of the aerodynamic forces on an aircraft is commonly done by solving numerically the Reynolds Averaged Navier-Stokes equations (RANS equations from now onwards) that model the movement of the flow around the aircraft, using discrete finite elements or finite volume models. With the demand of accuracy posed in the aeronautical industry, each one of these computations requires important computational resources.

The dimensioning aerodynamic forces are not known a priori, and since the global magnitude of the forces may depend on many different flight parameters, like angle of attack, angle of sideslip, Mach number, control surface deflection angle, it has been necessary to perform many lengthy and costly computations to properly calculate the maximum aerodynamic forces experienced by different aircraft components or the complete aircraft.

In order to reduce the overall number of these lengthy computations, approximate mathematical modelling techniques for obtaining a Reduced Order Model (ROM) have been developed in the past, like Single Value Decomposition (SVD) as a way to perform intelligent interpolation, or the more accurate Proper Orthogonal Decomposition (POD from now onwards) that takes into account the physics of the problem by using a Galerkin projection of the Navier-Stokes equations.

The idea of these techniques is to define the new analytical solution as a combination of the information obtained before. POD defines several modes that include the solution obtained by Computational Fluid Dynamics (CFD) and then uses those modes to reproduce solutions not obtained by CFD. The application of this techniques may require many CFD calculations involving a large computational cost.

The present invention is intended to solve this drawback.

SUMMARY OF THE INVENTION

It is an object of the present invention to provide methods for making analytical calculations of the aerodynamic forces experienced by a complete aircraft or an aircraft component which forces are dependant on a significant number of parameters, in such a way as to minimize the computational costs.

It is another object of the present invention to provide methods for making analytical calculations of the aerodynamic forces experienced by a complete aircraft or an aircraft component which forces are dependant of a significant number of parameters, in such a way as to minimize the number of CFD computations used.

These and other objects are met by a computer-aided method suitable for assisting in the design of an aircraft by providing the values of one or more dimensional variables, such as the pressure distribution along a wing surface, for the complete aircraft or an aircraft component, said one or more variables being dependant on a predefined set of parameters, such as a set including the angle of attack and the Mach number, said method comprising the following steps:
  Defining a parametric space grid setting predetermined distances between its values.
  Obtaining a suitable model for calculating said one or more dimensional variables for whatever point over the parametric space through an iterative process with respect to a reduced group of points, of increasing number of points in each iteration, comprising the following sub-steps:
    Calculating the values of said one or more dimensional variables for an initial group of points using a CFD model.
    Obtaining an initial ROM model from said CFD computations and calculating the values of said one or more dimensional variables for said initial group of points using the initial ROM model.
    Selecting the e-point of the group with the largest deviation $\epsilon$ between the results provided by the CFD and the ROM models and finishing the iterative process if $\epsilon$ is lesser than a predefined value $\epsilon_0$.
    Selecting new points over the parametric space to be added to the group of points as those points placed inside the parametric space grid at a predefined distance from said e-point.
    Calculating the values of said one or more dimensional variables for the new points using the CFD and the ROM model and going back to the third sub-step.

In particular, said one or more dimensional variables includes one or more of the following: aerodynamic forces, skin values and values distribution around the complete aircraft or aircraft component; said set parameters includes one or more of the following: angle of attack and Mach number; and said aircraft component is one of the following: a wing, an horizontal tail plane, a vertical tail plane.

In a preferred embodiment, said complete aircraft or an aircraft component is divided into blocks and said CFD and ROM models are applied block by block. Hereby an accurate method for providing the values of one or more dimensional variables of an aircraft or an aircraft component is achieved.

In another preferred embodiment said ROM model is a POD model. CFD is used to calculate the pressure distributions for an appropriately selected set of points over the parametric space, which are used to approximate, via POD and ad hoc interpolation, the dimensional variables in any other point over the parametric space. In addition, the method minimizes the required number of CFD calculations (to minimize the computational cost, which dramatically depends on this number) for a given level of error. This is made using POD and interpolation on the already calculated points. New points are selected iteratively, either one by one or in groups. Hereby a method for providing the values of one or more dimensional variables of an aircraft or an aircraft component dependant of a predefined set of parameters, optimizing the computing costs, is achieved.

Other characteristics and advantages of the present invention will be clear from the following detailed description of embodiments illustrative of its object in relation to the attached figures.

DETAILED DESCRIPTION OF THE INVENTION

An embodiment of a method according to the present invention will now be described for obtaining a POD model that allows calculating the steady pressure distribution over the surface of the wing of an aircraft, said pressure distribution being dependant on two free parameters: angle of attack ($\alpha$) and Mach number (M).

Figure 1:
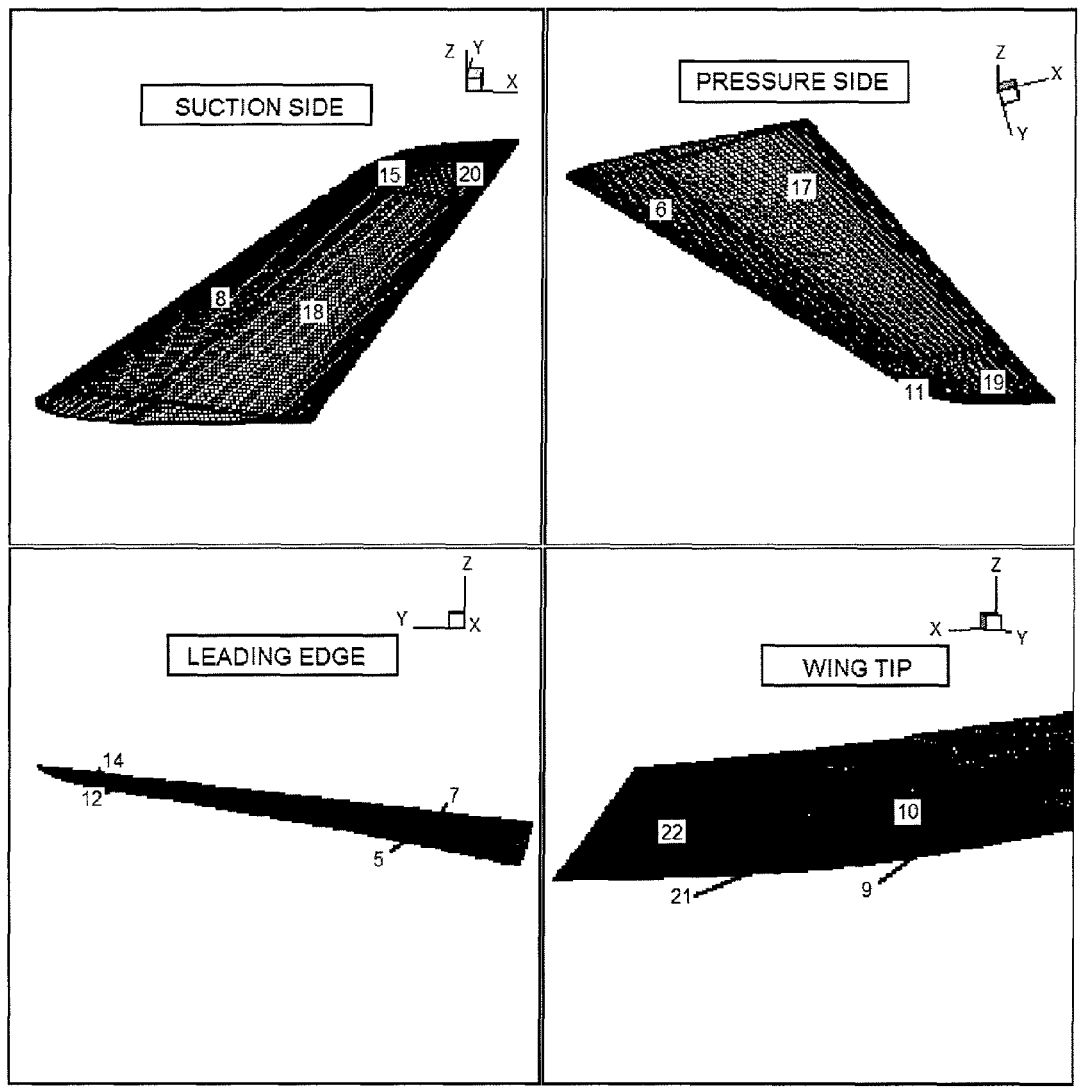
FIG. 1 shows views of the suction side, the pressure side, the leading edge and the tip of an aircraft wing divided in blocks.

Initiation Steps:

Step 1: Division of the wing into several blocks according to the geometry of the object. CFD tools usually divide the 3D computational domain into blocks, as illustrated in FIG. 1 showing the wing divided into 16 main blocks. This is a convenient but non-essential part of the method, which can be applied with just one block.

Step 2: A definition of a parametric space grid is carried out by setting an initial value of the minimal distance in each parameter in the parametric space, $d_l$, $l=1, \ldots,$ parameter #, which comes from a first guess of the smallest distance between points in the parametric space in the subsequent steps and could need some calibration. Such distance will be reduced by the method during the iteration, if needed. Then an equispaced grid is defined in parametric space based on these distances. Such grid will evolve during the process and can become non-equispaced.

For instance, if angle of attack ($\alpha$), in the range $-3°$ to $+3°$, and Mach number (M), in the range 0.40 to 0.80, are the parameters being considered, the parametric space grid can be defined setting the distances $d_\alpha=0.5$ and $d_M=0.05$.

Step 3: Initiation of the process for an initial group of points over the parametric space selected by the user, such as the following

| Initial Group | Mach | Alpha |
|---|---|---|
| P1 | 0.400 | −3.00 |
| P2 | 0.600 | −3.00 |
| P3 | 0.800 | −3.00 |
| P4 | 0.400 | 0.00 |
| P5 | 0.600 | 0.00 |
| P6 | 0.800 | 0.00 |
| P7 | 0.400 | 3.00 |
| P8 | 0.600 | 3.00 |
| P9 | 0.800 | 3.00 |

Introduction of the New Group of Points

Step 4: Application, block by block, of POD to the initial group of points. A block-dependent set of modes is obtained for each block:

$$P(\overline{x_i}; \alpha_j, M_k) = P_{ijk} \xrightarrow{POD} P_{ijk} = \sum_p A_p(\alpha_j, M_k)\phi_{ip},$$

where P is the pressure distribution, $x_i$ are the spatial coordinates, $\alpha$ is the angle of attack, M is the Mach number, $A_p$ are the mode amplitudes, and the columns of the matrix $\phi_{ip}$ are the POD modes. Each mode has an associated singular value, which results from application of POD.

Step 5: Classification of modes:
A first classification (in each block) of the modes into two parts is as follows: (a) those modes yielding a RMSE smaller than some threshold value $\epsilon_1$ (depending on $\epsilon_0$, after some calibration) are neglected; (b) the $n_1$ retained modes are called main modes.

Main modes, in turn, are classified into two groups, namely n primary modes and $n_1-n$ secondary modes with, with n obtained after some calibration, say $$n = \frac{4}{5}n_1,.$$

The root mean squared error (RMSE), is defined as $$RMSE = \sqrt{\frac{\sum_{i=1}^{N_p} error_i^2}{N_p}},$$

where $N_p$ is the total number of points of the mesh that defines the wing, and $error_i$ is the difference between the pressure of the approximation and the pressure of the CFD solution at i-th point of the mesh.

Step 6: POD reconstruction of the pressure distribution for each of the already computed group of points using the (n) main primary modes in each block. Then each point is further approximated using the neighboring points via least squares.

Step 7: Comparison between the CFD calculated and the POD+interpolation-approximated pressure profiles, and estimation of the RMSE in each block, for each already computed points.

The RMSE for the above-mentioned initial group of nine points is the following:

| | RMSE |
|---|---|
| P1 | 0.0371 |
| P2 | 0.0298 |
| P3 | 0.0887 |
| P4 | 0.0273 |
| P5 | 0.0190 |
| P6 | 0.0756 |
| P7 | 0.0605 |
| P8 | 0.0930 |
| P9 | 0.1758 |

Step 8: Selection of the point with largest RMSE.
As shown in the above table in the first iteration this point is P9.

Figure 2:
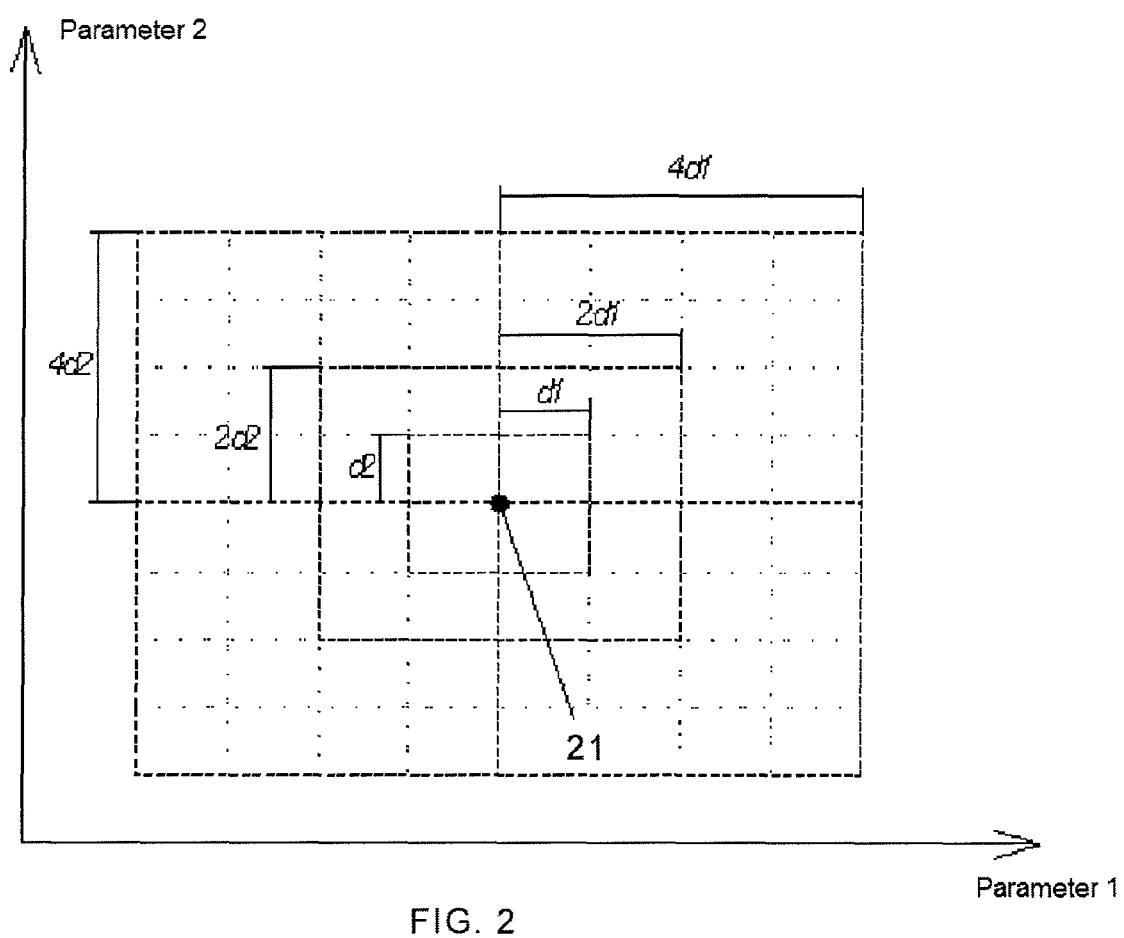
FIG. 2 shows a graphic representation of a local sub-grid in the parametric space grid for selecting new points to be added to the group of points used for obtaining the POD model according to this invention.

Step 9: Definition, as shown in FIG. 2, of a local sub-grid of the total parametric space grid in the vicinity of the point 21 of maximum error. Such local sub-grid consists of three levels, at distances $d_l$ (first level), $2 \cdot d_l$ (second level) and $4 \cdot d_l$ (third level).

Step 10: Selection of the level in which the new point will be introduced. If there are some points in between of two levels (see below), they are considered to belong to the inner level.
  If no points are present in the whole sub-grid, then the new point is introduced in the third level.
  If only the third level exhibits points, then the new point is introduced in the second level.
  If there are no points in the first level and there is only one point in the second level, the new point is introduced in the second level.

If there are no points in the first level and there are at least two points in the second level, the new point is introduced in the first level.

If at least one point is present in the first level, then the new point is introduced in the first level with one exception that leads to the introduction of a sub-level in the local grid. This occurs when (a) at least five points are present in the first level, and (b) at least four of these show the largest RMSE among all points in the three levels. In that case, the distances in the local sub-grid are divided by two and step 9 is repeated again with the resulting new subgrid. Note that this step means that each point will generally have a different set of minimal distances $d_j$.

In the example being considered, the new point P10 will be introduced in the third level because none of the points of the initial group is present in the whole sub-grid in the vicinity of P9.

Step 11: Once the target level has been chosen, the most space-filling point in this level is selected as follows. The minimum distance, D, from each possible candidate to the remaining, already selected points is computed. That candidate that shows the largest value of D is selected. D is the distance in the parametric space. In this example, the distance between two points of the parametric space (labeled 1 and 2) is defined as follows:

$$D_{12} = \sqrt{\alpha_{12}^2 + M_{12}^2}$$

where $$\alpha_{12} = \frac{\alpha_2 - \alpha_1}{\Delta\alpha} \text{ and } M_{12} = \frac{M_2 - M_1}{\Delta M}$$

are the distances in the parameters $\alpha$ and M, and $\Delta\alpha$ and $\Delta M$ are the corresponding total ranges in these parameters.

In the example being considered the distance between third level points and the closest point belonging to the group is shown in the following table.

| Third level points | | Closest point of the group | | |
|---|---|---|---|---|
| Mach | Alpha | Mach | Alpha | Distance |
| 0.650 | 3.00 | 0.600 | 3.00 | 0.1250 |
| 0.650 | 2.50 | 0.600 | 3.00 | 0.1502 |
| 0.650 | 2.00 | 0.600 | 3.00 | 0.2083 |
| 0.650 | 1.50 | 0.600 | 0.0 | 0.2795 |
| 0.700 | 1.50 | 0.600 | 0.0 | 0.3536 |
| 0.750 | 1.50 | 0.800 | 0.0 | 0.2795 |
| 0.800 | 1.50 | 0.800 | 0.0 | 0.2500 |

Therefore the new point to be introduced is P10: Mach=0.700, Alpha=1.50.

Step 12: If more than one point is introduced in each iteration, then the process is repeated from step 8 with the already selected points excluded.

Update of the Set of Modes:

Once the new point (or group of points) has been computed, the set of modes for each block is updated.

Step 13: Application of POD to the group of points, ignoring those modes that show a RMSE smaller than $\epsilon_1$.

Step 14: Computation of some pseudo-points, defined block by block, which consists of two groups:

The $n_1$ main modes of each block, multiplied by their respective singular values.

The POD modes obtained upon application of POD to the new points resulting from last iteration, multiplied by their respective singular values.

Steps 13 and 14 may be collapsed into just only one step. In this case pseudo-points are defined adding together the main modes of the already computed points, multiplied by their respective singular values, and the new points. Division into steps 13 and 14, as above, is made to filter out numerical errors from the process, which is a well known benefit of the POD method.

Step 15: Application of POD to the set of all pseudo-points, block by block.

Step 16: Repetition of the process from step 5.

To illustrate this iterative process a brief description of the second iteration in the example being considered follows:

The RMSE for the group of then points in the second iteration is the following:

| | RMSE |
|---|---|
| P1 | 0.0313 |
| P2 | 0.0242 |
| P3 | 0.0723 |
| P4 | 0.0275 |
| P5 | 0.0167 |
| P6 | 0.0569 |
| P7 | 0.0853 |
| P8 | 0.0458 |
| P9 | 0.1421 |
| P10 | 0.0260 |

El maximum error point is still P9 and the new point P11 will be introduced in the second level because there is not any point in the group in levels 1 and 2 and there is a point in level 3 (P10 introduced in the first iteration).

The distance between second level points and the closest point belonging to the group is shown in the following table:

| Second level points | | Closest point of the group | | |
|---|---|---|---|---|
| Mach | Alpha | Mach | Alpha | Distance |
| 0.700 | 3.00 | 0.800 | 3.00 | 0.2500 |
| 0.700 | 2.50 | 0.700 | 1.50 | 0.1667 |
| 0.700 | 2.00 | 0.700 | 1.50 | 0.0833 |
| 0.750 | 2.00 | 0.700 | 1.50 | 0.1502 |
| 0.750 | 2.00 | 0.800 | 3.00 | 0.1662 |

Therefore the new point to be introduced is P11: Mach=0.700, Alpha=2.50.

Stop Criteria:

Step 17: The process is completed when the RMSE, computed in step 7 using POD and both linear and a quadratic least squares interpolation, are both smaller than $\epsilon_0$.

Results

In the execution of the method in the example being considered the initial group of points over the parametric space was, as said before, the following:

| | Mach | Alpha |
|---|---|---|
| P1 | 0.400 | −3.00 |
| P2 | 0.600 | −3.00 |
| P3 | 0.800 | −3.00 |

|     | Mach  | Alpha |
| --- | ----- | ----- |
| P4  | 0.400 | 0.00  |
| P5  | 0.600 | 0.00  |
| P6  | 0.800 | 0.00  |
| P7  | 0.400 | 3.00  |
| P8  | 0.600 | 3.00  |
| P9  | 0.800 | 3.00  |

Along the iteration process, the following points were added to the group:

|     |       |      |
| --- | ----- | ---- |
| P10 | 0.700 | 1.50 |
| P11 | 0.700 | 2.50 |
| P12 | 0.800 | 2.00 |
| P13 | 0.500 | 1.50 |
| P14 | 0.750 | 2.50 |
| P15 | 0.400 | 2.00 |
| P16 | 0.700 | −1.00 |
| P17 | 0.750 | 1.50 |
| P18 | 0.750 | 3.00 |
| P19 | 0.800 | −1.50 |
| P20 | 0.500 | 2.50 |
| P21 | 0.800 | 2.50 |
| P22 | 0.800 | 1.50 |
| P23 | 0.700 | 0.50 |
| P24 | 0.750 | 1.00 |
| P25 | 0.700 | 3.00 |
| P26 | 0.750 | 2.00 |
| P27 | 0.450 | 2.50 |
| P28 | 0.800 | 1.00 |
| P29 | 0.450 | 3.00 |
| P30 | 0.750 | −0.50 |

An evaluation of the model obtained according to the method of this invention can be done comparing the results obtained in 16 test points using said model in several iterations with the results obtained using the CFD model that are shown in the following tables:

| Test Point | Mach | Alpha | CFD | Invention Model Results 10 Points | 15 Points | 20 Points | 25 Points | 30 Points |
| --- | --- | --- | --- | --- | --- | --- | --- | --- |
| Lift Coefficient | | | | | | | | |
| Tp1  | 0.800 |  2.25 |  0.1965 |  0.1922 |  0.1966 |  0.1965 |  0.1971 |  0.1966 |
| Tp2  | 0.800 |  1.25 |  0.1045 |  0.1061 |  0.1082 |  0.1075 |  0.1054 |  0.1058 |
| Tp3  | 0.800 | −1.25 | −0.1077 | −0.1089 | −0.1085 | −0.1073 | −0.1082 | −0.1088 |
| Tp4  | 0.800 | −2.25 | −0.1920 | −0.1871 | −0.1925 | −0.1927 | −0.1928 | −0.1936 |
| Tp5  | 0.775 |  2.25 |  0.1895 |  0.1899 |  0.1899 |  0.1903 |  0.1910 |  0.1900 |
| Tp6  | 0.775 |  1.25 |  0.1012 |  0.1036 |  0.1051 |  0.1031 |  0.1023 |  0.1018 |
| Tp7  | 0.775 | −1.25 | −0.1048 | −0.1018 | −0.1121 | −0.1057 | −0.1066 | −0.1068 |
| Tp8  | 0.775 | −2.25 | −0.1867 | −0.1853 | −0.1884 | −0.1908 | −0.1912 | −0.1916 |
| Tp9  | 0.725 |  2.25 |  0.1773 |  0.1849 |  0.1778 |  0.1788 |  0.1777 |  0.1774 |
| Tp10 | 0.725 |  1.25 |  0.0966 |  0.0971 |  0.0980 |  0.0965 |  0.0970 |  0.0970 |
| Tp11 | 0.725 | −1.25 | −0.1002 | −0.0962 | −0.1078 | −0.1022 | −0.1029 | −0.1022 |
| Tp12 | 0.725 | −2.25 | −0.1785 | −0.1812 | −0.1816 | −0.1829 | −0.1867 | −0.1864 |
| Tp13 | 0.525 |  2.25 |  0.1577 |  0.1565 |  0.1267 |  0.1563 |  0.1561 |  0.1585 |
| Tp14 | 0.525 |  1.25 |  0.0868 |  0.0722 |  0.0845 |  0.0847 |  0.0873 |  0.0854 |
| Tp15 | 0.525 | −1.25 | −0.0897 | −0.0749 | −0.0960 | −0.0786 | −0.0964 | −0.1084 |
| Tp16 | 0.525 | −2.25 | −0.1600 | −0.1580 | −0.1598 | −0.1196 | −0.1199 | −0.1197 |
| X Momentum Coefficient | | | | | | | | |
| Tp1  | 0.800 |  2.25 | +0.2062 |  0.1979 |  0.2054 |  0.2054 |  0.2068 |  0.2061 |
| Tp2  | 0.800 |  1.25 | +0.1109 |  0.1124 |  0.1181 |  0.1174 |  0.1128 |  0.1127 |
| Tp3  | 0.800 | −1.25 | −0.1018 | −0.1023 | −0.1024 | −0.1010 | −0.1016 | −0.1022 |
| Tp4  | 0.800 | −2.25 | −0.1866 | −0.1810 | −0.1867 | −0.1866 | −0.1866 | −0.1870 |
| Tp5  | 0.775 |  2.25 | +0.1991 |  0.1957 |  0.1984 |  0.1992 |  0.2010 |  0.1995 |
| Tp6  | 0.775 |  1.25 | +0.1078 |  0.1102 |  0.1140 |  0.1117 |  0.1090 |  0.1085 |
| Tp7  | 0.775 | −1.25 | −0.0987 | −0.0953 | −0.1067 | −0.0993 | −0.0999 | −0.1000 |
| Tp8  | 0.775 | −2.25 | −0.1812 | −0.1790 | −0.1824 | −0.1846 | −0.1848 | −0.1850 |
| Tp9  | 0.725 |  2.25 | +0.1849 |  0.1910 |  0.1858 |  0.1875 |  0.1853 |  0.1849 |
| Tp10 | 0.725 |  1.25 | +0.1036 |  0.1041 |  0.1060 |  0.1029 |  0.1036 |  0.1037 |
| Tp11 | 0.725 | −1.25 | −0.0939 | −0.0894 | −0.1018 | −0.0955 | −0.0959 | −0.0954 |
| Tp12 | 0.725 | −2.25 | −0.1728 | −0.1746 | −0.1749 | −0.1760 | −0.1798 | −0.1796 |
| Tp13 | 0.525 |  2.25 | +0.1654 |  0.1644 |  0.1279 |  0.1637 |  0.1637 |  0.1658 |
| Tp14 | 0.525 |  1.25 | +0.0943 |  0.0809 |  0.0926 |  0.0928 |  0.0953 |  0.0933 |
| Tp15 | 0.525 | −1.25 | −0.0827 | −0.0668 | −0.0879 | −0.0704 | −0.0879 | −0.1001 |
| Tp16 | 0.525 | −2.25 | −0.1534 | −0.1499 | −0.1514 | −0.1100 | −0.1100 | −0.1096 |
| Y Momentum Coefficient | | | | | | | | |
| Tp1  | 0.800 |  2.25 | −0.1068 | −0.1044 | −0.1076 | −0.1074 | −0.1081 | −0.1076 |
| Tp2  | 0.800 |  1.25 | −0.0345 | −0.0377 | −0.0392 | −0.0387 | −0.0361 | −0.0363 |
| Tp3  | 0.800 | −1.25 | +0.1270 |  0.1278 |  0.1279 |  0.1266 |  0.1273 |  0.1278 |
| Tp4  | 0.800 | −2.25 | +0.1914 |  0.1877 |  0.1921 |  0.1921 |  0.1923 |  0.1928 |
| Tp5  | 0.775 |  2.25 | −0.1036 | −0.1036 | −0.1038 | −0.1044 | −0.1054 | −0.1043 |
| Tp6  | 0.775 |  1.25 | −0.0340 | −0.0374 | −0.0384 | −0.0367 | −0.0351 | −0.0347 |
| Tp7  | 0.775 | −1.25 | +0.1232 |  0.1215 |  0.1295 |  0.1241 |  0.1247 |  0.1248 |
| Tp8  | 0.775 | −2.25 | +0.1858 |  0.1853 |  0.1878 |  0.1892 |  0.1896 |  0.1898 |
| Tp9  | 0.725 |  2.25 | −0.0960 | −0.1017 | −0.0970 | −0.0982 | −0.0967 | −0.0965 |
| Tp10 | 0.725 |  1.25 | −0.0335 | −0.0344 | −0.0356 | −0.0337 | −0.0338 | −0.0338 |
| Tp11 | 0.725 | −1.25 | +0.1171 |  0.1151 |  0.1241 |  0.1188 |  0.1193 |  0.1188 |

-continued

| Test Point | Mach | Alpha | CFD | Invention Model Results | | | | |
| --- | --- | --- | --- | --- | --- | --- | --- | --- |
| | | | | 10 Points | 15 Points | 20 Points | 25 Points | 30 Points |
| Tp12 | 0.725 | −2.25 | +0.1770 | 0.1800 | 0.1805 | 0.1807 | 0.1833 | 0.1831 |
| Tp13 | 0.525 | 2.25 | −0.0868 | −0.0877 | −0.0618 | −0.0849 | −0.0847 | −0.0867 |
| Tp14 | 0.525 | 1.25 | −0.0321 | −0.0233 | −0.0302 | −0.0302 | −0.0321 | −0.0307 |
| Tp15 | 0.525 | −1.25 | +0.1029 | 0.0911 | 0.1067 | 0.0924 | 0.1078 | 0.1172 |
| Tp16 | 0.525 | −2.25 | +0.1564 | 0.1542 | 0.1548 | 0.1219 | 0.1221 | 0.1218 |

Modifications may be introduced into the preferred embodiment just set forth, which are comprised within the scope defined by the following claims.

The invention claimed is:

1. A computer-aided method for assisting in the design of an aircraft by providing the values of one or more dimensional variables for the complete aircraft or an aircraft component, said one or more variables being dependant on a predefined set of parameters, said method comprising the following steps at least one of which is carried out on a computer processor:
 a) Defining a parametric space grid setting predetermined distances between its values;
 b) Obtaining a model for calculating said one or more dimensional variables for whatever point over the parametric space grid through an iterative process with respect to a reduced group of points, of increasing number of points in each iteration, comprising the following sub-steps:
  b1) Calculating the values of said one or more dimensional variables for an initial group of points using a CFD model;
  b2) Obtaining an initial ROM model from said CFD computations and calculating the values of said one or more dimensional variables for said initial group of points using the initial ROM model;
  b3) Establishing a group with the largest deviation $\epsilon$ between the results provided by the CFD and the ROM models, selecting the e-point thereof and finishing the iterative process if $\epsilon$ is less than a predefined value $\epsilon_0$;
  b4) Selecting new points over the parametric space grid to be added to the group of points established in step b3) as those points placed inside the parametric space grid at a predefined distance from said e-point;
  b5) Calculating the values of said one or more dimensional variables for the new points using the CFD and the ROM models and going back to sub-step b3).

2. A computer-aided method according to claim 1, wherein said complete aircraft or an aircraft component is divided into blocks and said CFD and ROM models are applied block by block.

3. A computer-aided method according to claim 1, wherein said one or more dimensional variables includes one or more of the following: aerodynamic forces, skin values, and values distribution around the complete aircraft or aircraft component.

4. A computer-aided method according to claim 1, wherein said predefined set of parameters includes one or more of the following: angle of attack, and Mach number.

5. A computer-aided method according to claim 1, wherein said aircraft component is one of the following: a wing, a horizontal tail plane, and a vertical tail plane.

6. A computer-aided method according to claim 1, wherein said ROM model is a POD model.

7. A computer-aided method according to claim 6 wherein the deviation $\epsilon$ between the results provided by the CFD and the POD models is obtained as the root mean square error between said results.

8. A computer-aided method according to claim 6, wherein the POD model used is obtained by eliminating the less relevant modes of the group of points.

* * * * *